(12) United States Patent
Sato et al.

(10) Patent No.: US 10,056,853 B2
(45) Date of Patent: Aug. 21, 2018

(54) DRIVE DEVICE AND CONTROL METHOD FOR DRIVE DEVICE

(71) Applicants: Toyota Jidosha Kabushiki Kaisha, Toyota-shi, Aichi-ken (JP); Aisin AW Co., Ltd., Anjo-shi, Aichi-ken (JP)

(72) Inventors: Ryoji Sato, Toyohashi (JP); Shogo Tanaka, Anjo (JP); Takuya Shimaji, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 0 days.

(21) Appl. No.: 15/416,656

(22) Filed: Jan. 26, 2017

(65) Prior Publication Data

US 2017/0229984 A1    Aug. 10, 2017

(30) Foreign Application Priority Data

Feb. 5, 2016  (JP) ................................ 2016-020841

(51) Int. Cl.

| H02P 21/00 | (2016.01) |
|---|---|
| H02P 6/15 | (2016.01) |
| H02P 21/20 | (2016.01) |
| H02P 6/10 | (2006.01) |

(52) U.S. Cl.
CPC ............... *H02P 6/153* (2016.02); *H02P 6/10* (2013.01); *H02P 21/20* (2016.02)

(58) Field of Classification Search
CPC ............. H02P 6/153; H02P 21/20; H02P 6/10

USPC ...................................................... 318/400.02
See application file for complete search history.

(56) References Cited

U.S. PATENT DOCUMENTS

| 2007/0107973 A1* | 5/2007 | Jiang | ....................... B62D 5/046 180/443 |
|---|---|---|---|
| 2008/0167779 A1* | 7/2008 | Suzuki | ................... B62D 5/046 701/42 |
| 2008/0201041 A1* | 8/2008 | Jiang | ....................... B62D 5/046 701/42 |

FOREIGN PATENT DOCUMENTS

JP          2002223582 A       8/2002

\* cited by examiner

*Primary Examiner* — Erick Glass

(74) *Attorney, Agent, or Firm* — Dinsmore & Shohl LLP

(57) ABSTRACT

Basic current commands of a d-axis and a q-axis are set based on a torque command of a motor. Subsequently, when the rotation speed of the motor is high, an electric angle compensation amount is set to be larger than that when the rotation speed of the motor is low, and a corrected predicted electric angle is set by adding the electric angle compensation amount to a predicted electric angle predicted from an electric angle based on a rotation position of a rotor of the motor from a rotation position detection sensor. Then, current commands of the d-axis and the q-axis are set by multiplying the basic current commands of the d-axis and the q-axis by a correction coefficient based on the corrected predicted electric angle, and an inverter is controlled using the current commands.

4 Claims, 4 Drawing Sheets

DRIVE DEVICE AND CONTROL METHOD FOR DRIVE DEVICE

CROSS-REFERENCE TO RELATED APPLICATIONS

This application claims priority to Japanese Patent Application No. 2016-020841 filed on Feb. 5, 2016, the entire contents of which are hereby incorporated by reference.

BACKGROUND

1. Technical Field

The present disclosure relates to a drive device and a control method for a drive device.

2. Description of Related Art

Hitherto, as this kind of drive device, a drive device including a motor, an inverter configured to drive the motor, a magnetic pole phase detector configured to detect a magnetic pole phase of the motor, and a control device configured to control the inverter is suggested (for example, see Japanese Patent Application Publication No. 2002-223582 (JP 2002-223582 A)). The control device calculates the magnitude of a torque ripple generated in output torque of the motor according to the magnitude of a torque command of the motor to create a torque ripple amplitude signal, calculates a sine signal according to the phase of the torque ripple from the magnetic pole phase of the motor detected by the magnetic pole phase detector, and multiplies the torque ripple amplitude signal and the sine signal to calculate a torque ripple suppression signal. The torque ripple suppression signal is injected into the torque command of the motor to create a new torque command, and a plurality of switching elements of the inverter are switched using the new torque command. With such control, a ripple component generated in the output torque of the motor is suppressed.

SUMMARY

In such a motor drive device, deviation occurs between the magnetic pole phase (electric angle) of the motor detected by the magnetic pole phase detector and an actual magnetic pole phase of the motor when actual torque (current) of the motor changes (pulsates) according to switching of a plurality of switching elements of the inverter. Accordingly, if the sine signal and the torque ripple suppression signal are calculated using the magnetic pole phase of the motor as it is, the torque ripple of the motor may not be sufficiently suppressed. In particular, if the torque ripple of the motor becomes a high frequency, such a phenomenon is likely to occur.

A drive device and a control method for a drive device of the disclosure is capable of sufficiently suppressing a torque ripple of a motor.

An example aspect of the present disclosure provides a drive device including a motor, an inverter configured to drive the motor by switching a plurality of switching elements, and an electronic control unit configured to i) calculate an electric angle of the motor and a rotation speed of the motor, ii) set an electric angle compensation amount for compensating for deviation between an actual electric angle of the motor when a control signal is output to the inverter and an actual electric angle of the motor when a torque of the motor changes such that the electric angle compensation amount when the rotation speed of the motor is high is larger than the electric angle compensation amount when the rotation speed of the motor is low, iii) set an electric angle for compensation using the electric angle of the motor and the electric angle compensation amount, iv) set corrected torque by correcting required torque required for the motor based on the electric angle for compensation such that a torque ripple of the motor is cancelled, and v) control the inverter such that the corrected torque is output from the motor. Another example aspect of the present disclosure provides a control method for a drive device. The drive device includes a motor, an inverter configured to drive the motor by switching a plurality of switching elements, and an electronic control unit. The control method includes i) calculating, by the electronic control unit, an electric angle of the motor and a rotation speed of the motor, ii) setting, by the electronic control unit, an electric angle compensation amount for compensating for deviation between an actual electric angle of the motor when a control signal is output to the inverter and an actual electric angle of the motor when a torque of the motor changes such that the electric angle compensation amount when the rotation speed of the motor is high is larger than the electric angle compensation amount when the rotation speed of the motor is low, iii) setting, by the electronic control unit, an electric angle for compensation using the electric angle of the motor and the electric angle compensation amount, iv) setting, by the electronic control unit, corrected torque by correcting required torque required for the motor based on the electric angle for compensation such that a torque ripple of the motor is cancelled, and v) controlling, by the electronic control unit, the inverter such that the corrected torque is output from the motor.

The drive device of the disclosure includes an electronic control unit which detects the electric angle of the motor and the rotation speed of the motor. Then, when the rotation speed of the motor detected by the electronic control unit is high, the electric angle compensation amount for compensating for deviation between the actual electric angle of the motor when the control signal is output to the inverter and the actual electric angle of the motor when the torque of the motor changes is set to be larger than that when the rotation speed is low, the electric angle for compensation is set using the electric angle of the motor detected by the electronic control unit and the electric angle compensation amount. The corrected torque is set by correcting the required torque required for the motor based on the electric angle for compensation such that the torque ripple of the motor is cancelled, and the inverter is controlled such that the corrected torque is output from the motor. When the rotation speed of the motor is high (the frequency of the torque ripple of the motor is high), deviation between the electric angle detected by the electronic control unit and the actual electric angle of the motor when the actual torque (current) of the motor changes according to switching of a plurality of switching elements of the inverter becomes larger than that when the rotation speed of the motor is low (the frequency of the torque ripple of the motor is low). Accordingly, when the rotation speed of the motor is high, the electric angle compensation amount is set to be larger than that when the rotation speed of the motor is low, and control is performed based on the required torque and the electric angle for compensation according to the electric angle detected by the electronic control unit and the electric angle compensation amount such that torque (corrected torque) with the torque ripple of the motor cancelled from the required torque is output from the motor, whereby it is possible to more sufficiently suppress the torque ripple of the motor. As a result, it is possible to more sufficiently suppress vibration of the motor and noise.

The electronic control unit may be configured to vi) set a basic current command of a d-axis based on the required torque, vii) set a basic current command of a q-axis based on the required torque, viii) set a correction coefficient for cancelling the torque ripple based on the required torque and the electric angle for compensation, ix) set a current command of the d-axis by multiplying the basic current command of the d-axis by the correction coefficient, x) set a current command of the q-axis by multiplying the basic current command of the q-axis by the correction coefficient, and xi) control the inverter using the current command of the d-axis and the current command of the q-axis. In this case, the current command of the d-axis and the current command of the q-axis are set using the correction coefficient based on the electric angle for compensation, whereby it is possible to more sufficiently suppress the torque ripple of the motor.

The electronic control unit may be configured to xii) set a feedback term of the d-axis based on the current command of the d-axis and a current of the d-axis, xiii) set a feedforward term of the d-axis based on the electric angle for compensation, the required torque, and the rotation speed of the motor, xiv) set a voltage command of the d-axis using the feedforward term of the d-axis and the feedback term of the d-axis, xv) set a feedback term of the q-axis based on the current command of the q-axis and a current of the q-axis, xvi) set a feedforward term of the q-axis based on the electric angle for compensation, the required torque, and the rotation speed of the motor, xvii) set a voltage command of the q-axis using the feedforward term of the q-axis and the feedback term of the q-axis, and xviii) control the inverter using the voltage command of the d-axis and the voltage command of the q-axis. In this case, with the use of the feedforward term of the d-axis and the feedforward term of the q-axis according to the electric angle for compensation, the required torque, and the rotation speed are used, whereby it is possible to more sufficiently suppress the torque ripple of the motor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described using an example.

Figure 1:
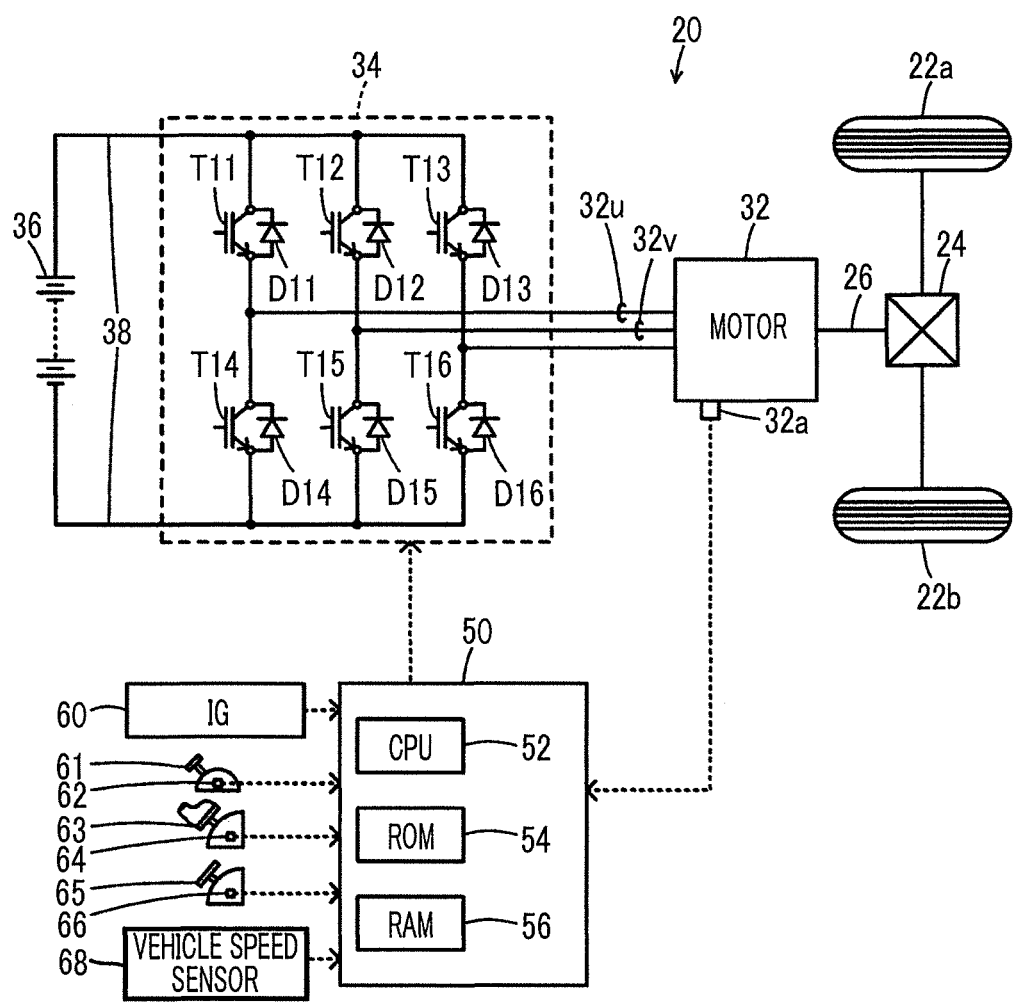
FIG. 1 is a configuration diagram showing the outline of the configuration of an electric vehicle 20 in which a drive device as an example of the disclosure is mounted.

FIG. 1 is a configuration diagram showing the outline of the configuration of an electric vehicle 20 in which a drive device as an example of the disclosure is mounted. As shown in FIG. 1, the electric vehicle 20 of the example includes a motor 32, an inverter 34, a battery 36, and an electronic control unit (ECU) 50.

The motor 32 is constituted as, for example, a synchronous motor generator, and a rotor is connected to a drive shaft 26 coupled to drive wheels 22a, 22b through a differential gear 24. The inverter 34 is connected to the motor 32 and is connected to the battery 36 through a power line 38. The inverter 34 has six transistors (switching element) T11 to T16 and six diodes D11 to D16. The transistors T11 to T16 are arranged in pairs of two so as to become a source side and a sink side with respect to a positive electrode line and a negative of the power line 38. The six diodes D11 to D16 are respectively connected in parallel with the transistors T11 to T16 in a reverse direction. Three-phase coils (U-phase, V-phase, and W-phase) of the motor 32 are respectively connected to respective connection points of the transistors to be paired of the transistors T11 to T16. Accordingly, when a voltage is applied to the inverter 34, the ratio of the on times of the transistors T11 to T16 to be paired is adjusted by the ECU 50, whereby a rotating magnetic field is formed in the three-phase coils and the motor 32 is rotationally driven.

The battery 36 is constituted as, for example, a lithium-ion secondary battery or a nickel-hydrogen secondary battery, and is connected to the inverter 34 through the power line 38 as described above.

The ECU 50 is constituted as a microcomputer centering on a CPU 52, and includes, in addition to the Central Processing Unit (CPU) 52, a Reading Only Memory (ROM) 54 storing a processing program, a Random Access Memory (RAM) 56 temporarily storing data, and an input/output port.

Signals from various sensors are input to the ECU 50 through an input port. Examples of the signals input to the ECU 50 include a rotation position θm from a rotation position detection sensor (for example, a resolver) 32a detecting a rotation position of the rotor of the motor 32, currents Iu, Iv from current sensors 32u, 32v detecting a current flowing in each phase of the motor 32, an ignition signal from ignition switch 60, a shift position SP from a shift position sensor 62 detecting an operation position of a shift lever 61, an accelerator opening Acc from an accelerator pedal position sensor 64 detecting a depression amount of an accelerator pedal 63, a brake pedal position BP from a brake pedal position sensor 66 detecting a depression amount of a brake pedal 65 and a vehicle speed V from a vehicle speed sensor 68.

A switching control signal and the like to the transistors T11 to T16 of the inverter 34 are output from the ECU 50 through an output port.

The ECU 50 calculates the electric angle θe of the motor 32 and the rotation speed Nm of the motor 32 based on the rotation position θm of the rotor of the motor 32 from the rotation position detection sensor 32a.

In the electric vehicle 20 of the example configured as above, first, required torque Tp* required for the drive shaft 26 is set based on the accelerator opening Acc and the vehicle speed V. Subsequently, the required torque Tp* is set as a torque command Tm* of the motor 32. Then, the transistors T11 to T16 of the inverter 34 are switched using the torque command Tm* of the motor 32 through pulse width modulation control (PWM control). The PWM control is control for adjusting the ratio of the on times of the transistors T11 to T16 by comparing a voltage command of the motor 32 with a carrier (triangular-wave) voltage. In the example, a triangular-wave voltage of about several kHz to 10 kHz is used as the carrier voltage.

Figure 2:
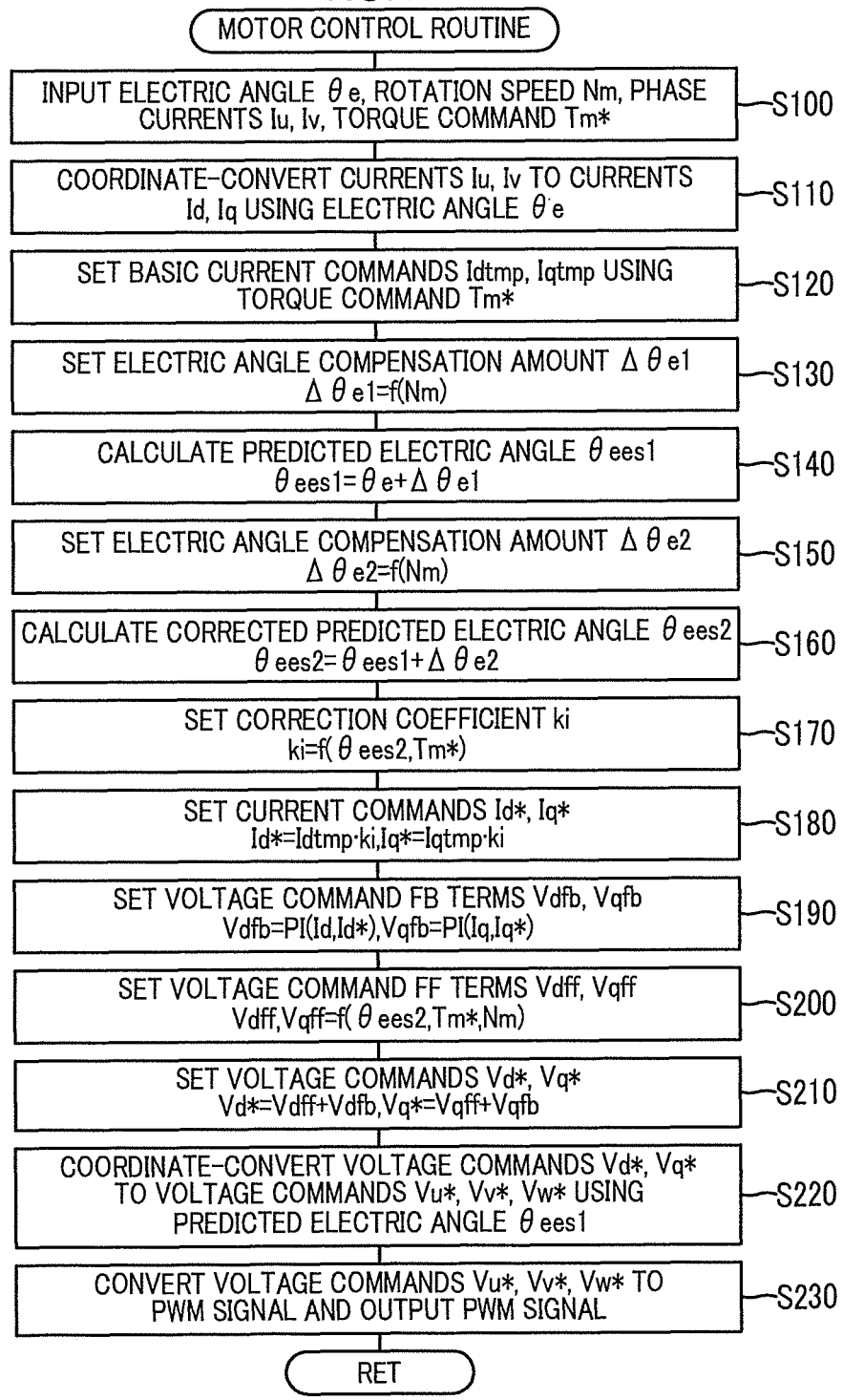
FIG. 2 is a flowchart showing an example of a motor control routine which is executed by an electronic control unit 50 of the example.

Next, the operation of the electric vehicle 20 of the example configured as above, and in particular, an operation when controlling the motor 32 will be described. FIG. 2 is a flowchart showing an example of a motor control routine which is executed by the ECU 50 of the example. This routine is repeatedly executed.

If the motor control routine is executed, first, the ECU 50 inputs the electric angle θe, the rotation speed Nm, currents Iu, Iv of a U-phase and a V-phase, and the torque command Tm* of the motor 32 (Step S100). As the electric angle θe and the rotation speed Nm, values calculated based on the rotation position θm of the rotor of the motor 32 detected by the rotation position detection sensor 32a are input. As the currents Iu, Iv, values detected by the current sensors 32u, 32v are input. As the torque command Tm*, a value set by the above-described drive control is input.

Subsequently, assuming that the total sum of the currents Iu, Iv, Iw flowing in the U-phase, the V-phase, and the W phase of the three-phase coils of the motor 32 is zero, the currents Iu, Iv of the U-phase and the V-phase are coordinate-converted (three-phase to two-phase conversion) to currents Id, Iq of the d-axis and the q-axis using the electric angle θe of the motor 32 (Step S110).

Basic current commands Idtmp, Iqtmp as basic values of current commands Id*, Iq* of the d-axis and the q-axis are set based on the torque command Tm* of the motor 32 (Step S120). In the example, the basic current commands Idtmp, Iqtmp of the d-axis and the q-axis are set by determining the relationship between the torque command Tm* of the motor 32 and the basic current commands Idtmp, Iqtmp of the d-axis and the q-axis in advance, storing the relationship in the ROM 54 as a current command setting map, and if the torque command Tm* of the motor 32 is given, deriving the corresponding basic current commands Idtmp, Iqtmp of the d-axis and the q-axis from the map.

Next, an electric angle compensation amount Δθe1 is set based on the rotation speed Nm of the motor 32 (Step S130), and a predicted electric angle θees1 of the motor 32 is calculated by adding the electric angle compensation amount Δθe1 to the electric angle θe of the motor 32 input in Step S100 (Step S140). The electric angle compensation amount Δθe1 is a compensation amount for compensating for deviation between the electric angle θe input in Step S100 and an actual electric angle when a PWM signal is output from the ECU 50 to the inverter 34 (an advance amount of the latter with respect to the former). In the example, a movement amount of an electric angle corresponding to 1.5 cycles of the carrier voltage is set based on the rotation speed Nm of the motor 32, and the predicted electric angle θees1 of the motor 32 corresponds to "an electric angle detected by the ECU" of the disclosure.

Figure 3:
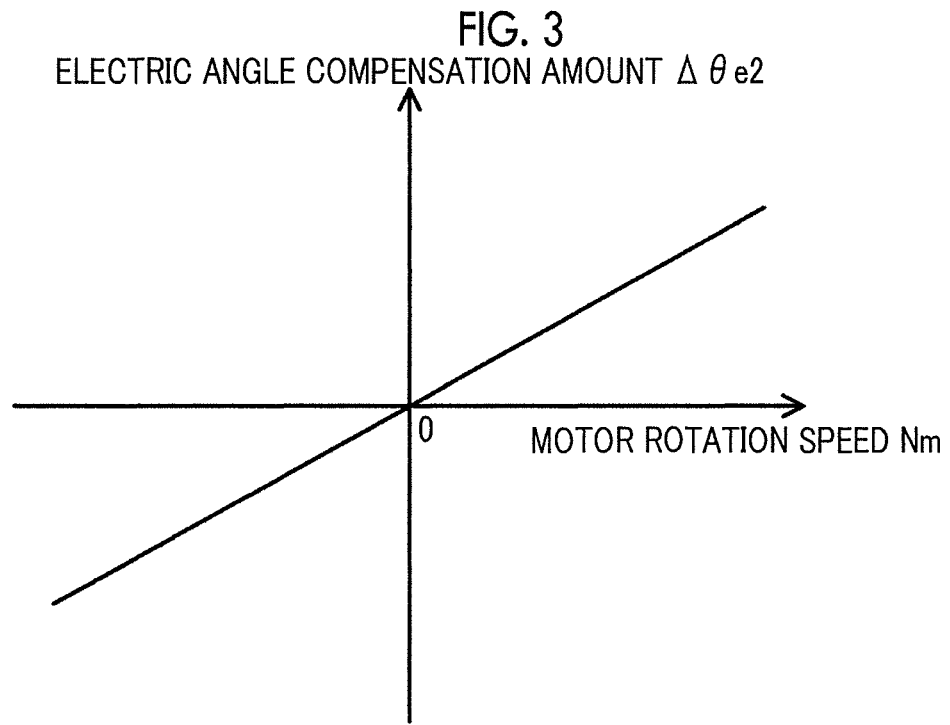
FIG. 3 is an explanatory view showing an example of an electric angle compensation amount setting map.

Subsequently, an electric angle compensation amount Δθe2 is set based on the rotation speed Nm of the motor 32 (Step S150), and a corrected predicted electric angle θees2 of the motor 32 is calculated by adding the electric angle compensation amount Δθe2 to the predicted electric angle θees1 of the motor 32 (Step S160). The electric angle compensation amount Δθe2 is a compensation amount for compensating for deviation between the actual electric angle of the motor 32 when the PWM signal is output from the ECU 50 to the inverter 34 and an actual electric angle when actual torque (current) of the motor 32 changes (pulsates) according to switching of the transistors T11 to T16 of the inverter 34 (an advance amount of the latter with respect to the former), and in the example, the electric angle compensation amount Δθe2 is set by determining relationship between the rotation speed Nm of the motor 32 and the electric angle compensation amount Δθe2 in advance, storing the relationship in the ROM 54 as an electric angle compensation amount setting map, and if the rotation speed Nm of the motor 32 is given, deriving the corresponding electric angle compensation amount Δθe2 from the map. An example of the electric angle compensation amount setting map is shown in FIG. 3. As shown in the drawing, the electric angle compensation amount Δθe2 has a value of zero when the rotation speed Nm of the motor 32 has a value of zero, and when the rotation speed Nm2 of the motor 32 is high, the electric angle compensation amount Δθe2 is set to be larger than that when the rotation speed Nm2 of the motor 32 is low. In detail, the electric angle compensation amount Δθe2 is set to be larger when the rotation speed Nm of the motor 32 is higher. This is because, when the rotation speed Nm of the motor 32 is high (the frequency of a torque ripple of the motor 32 is high), deviation between the predicted electric angle θees1 of the motor 32 and the actual electric angle of the motor 32 when the actual torque (current) of the motor 32 changes according to switching of the transistors T11 to T16 of the inverter 34 (an advance amount of the latter with respect to the former) is larger than that when the rotation speed Nm of the motor 32 is low (the frequency of the torque ripple of the motor 32 is low).

Next, a correction coefficient ki for use in correcting the basic current commands Idtmp, Iqtmp of the d-axis and the q-axis is set based on the corrected predicted electric angle θees2 and the torque command Tm* of the motor 32 (Step S170), and as shown in Expressions (1) and (2), current commands Id*, Iq* of the d-axis and the q-axis are calculated by multiplying the basic current commands Idtmp, Iqtmp of the d-axis and the q-axis by the correction coefficient ki (Step S180).

$$Id^* = Idtmp \cdot ki \qquad (1)$$

$$Iq^* = Iqtmp \cdot ki \qquad (2)$$

Figure 4:
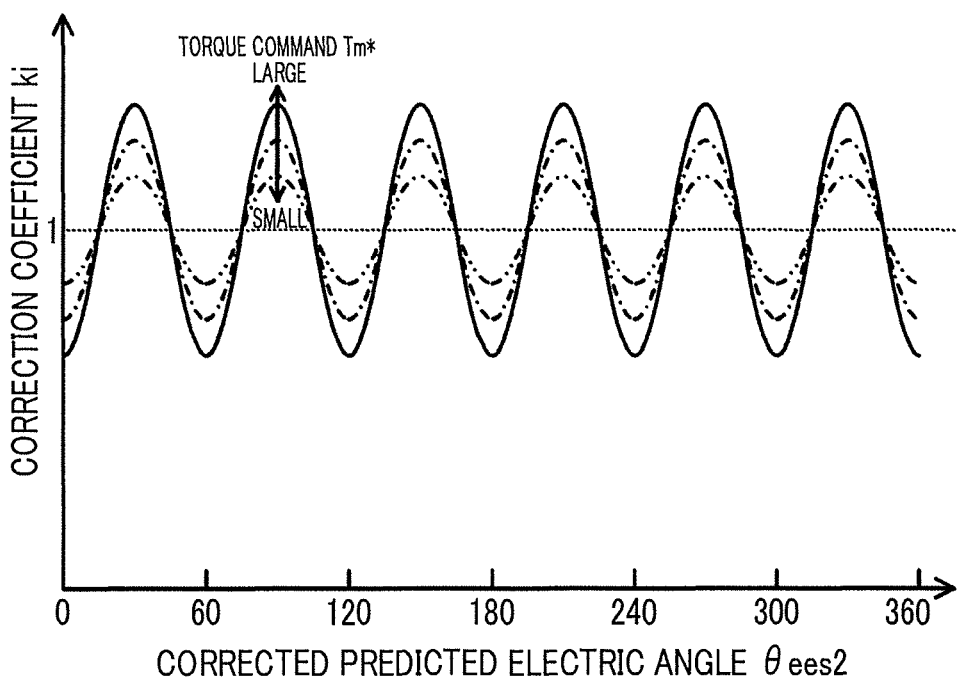
FIG. 4 is an explanatory view showing an example of a correction coefficient setting map.

In the example, the correction coefficient ki is set by determining the relationship between the corrected predicted electric angle θees2 and the torque command Tm* of the motor 32 and the correction coefficient ki in advance, storing the relationship in the ROM 54 as a correction coefficient setting map, and if, the torque command Tm* and the corrected predicted electric angle θees2 of the motor 32 are given, deriving the corresponding correction coefficient ki from the map. An example of the correction coefficient setting map is shown in FIG. 4. FIG. 4 shows an example of a correction coefficient in a case where a torque ripple of motor 32 occurs at an electric angle 6th-order (six cycles with respect to one cycle of an electric angle). As shown in the drawing, the correction coefficient ki is set so as to fluctuate with a value of 1 as a center based on the corrected predicted electric angle θees2 such that the torque ripple of the motor 32 can be cancelled. The range of the corrected predicted electric angle θees2 of making the correction coefficient ki smaller than the value of 1 means the range in which the output torque is larger than the torque command Tm* by the torque ripple of the motor 32 if the basic current commands Idtmp, Iqtmp of the d-axis and the q-axis are set as the current commands Id*, Iq* as they are, that is, the range of the corrected predicted electric angle θees2 in which the current commands Id*, Iq* need to be smaller than the basic current commands Idtmp, Iqtmp in order to cancel the torque ripple of the motor 32. The range of the corrected predicted electric angle θees2 of making the correction coefficient ki larger than the value of 1 means the range in which the output torque is smaller than the torque command Tm* by the torque ripple of the motor 32 if the basic current commands Idtmp, Iqtmp of the d-axis and the q-axis are set as the current commands Id*, Iq* as they are, that is, the range of the corrected predicted electric angle θees2 in which the current commands Id*, Iq* need to be larger than the basic current commands Idtmp, Iqtmp in order to cancel the torque ripple of the motor 32. The correction coefficient ki is set so as to fluctuate more largely with the value 1 as a center when the torque command Tm* of the motor 32 is large than when the torque command Tm* of the motor 32 is small. This is because the torque ripple of the motor 32 becomes large more easily when the torque command Tm* of the motor 32 is large than when the torque command Tm* of the motor 32 is small. The correction coefficient ki is not limited to that in FIG. 4, and may be set according to the order (for example, one or a plurality of electric angle 6th-order, electric angle 12th-order, electric angle 24th-order, . . . ) of a component of a torque ripple to be reduced.

Accordingly, the current commands Id*, Iq* of the d-axis and the q-axis which are calculated by multiplying the basic current commands Idtmp, Iqtmp of the d-axis and the q-axis by the correction coefficient ki become current commands corresponding to corrected torque obtained by correcting the torque command Tm* of the motor 32 based on the corrected predicted electric angle θees2 such that the torque ripple of the motor 32 is cancelled.

Next, feedback terms Vdfb, Vqfb of voltage commands Vd*, Vq* of the d-axis and the q-axis are set using the current commands Id*, Iq* of the d-axis and the q-axis and the currents Id, Iq of the d-axis and the q-axis by Expressions (3) and (4) (Step S190). In Expressions (3) and (4), "kd1", "kq1" are gains of proportional terms, and "kd2", "kq2" are gains of integration terms.

$$Vdfb = kd1 \cdot (Id^* - Id) + kd2 \int (Id^* - Id) dt \quad (3)$$

$$Vqfb = kq1 \cdot (Iq^* - Iq) + kq2 \int (Iq^* - Iq) dt \quad (4)$$

Figure 5A:
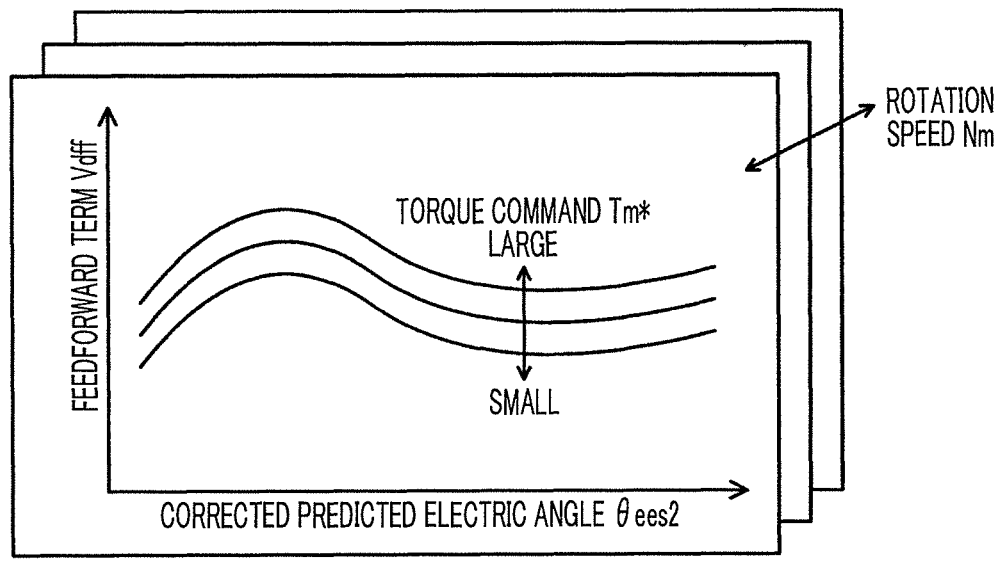
FIGS. 5A and 5B are explanatory views showing an example of a feedforward term setting map.
Figure 5B:
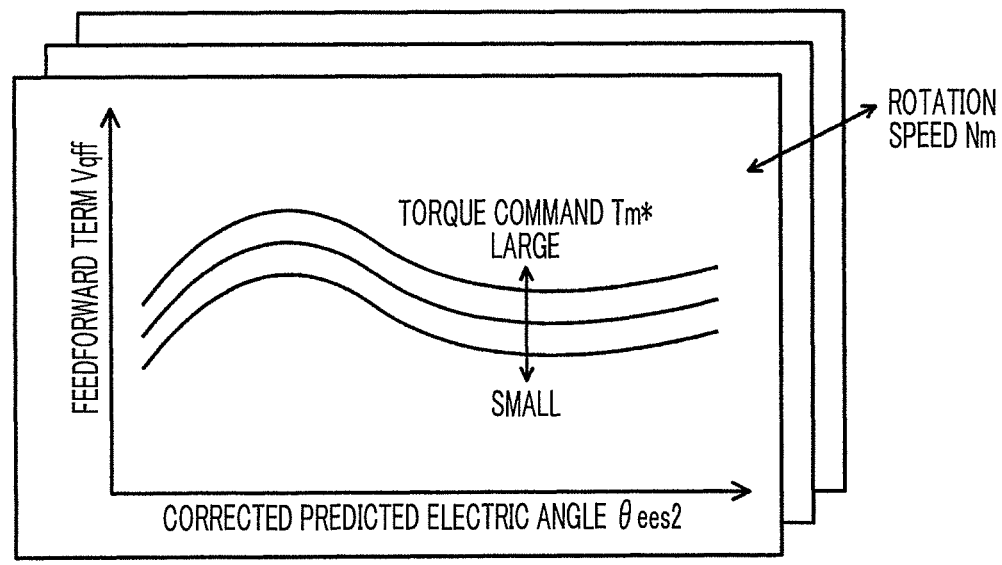

Subsequently, feedforward terms Vdff, Vqff of the voltage commands Vd*, Vq* of the d-axis and the q-axis are set based on the corrected predicted electric angle θees2, the torque command Tm*, and the rotation speed Nm of the motor 32 (Step S200). In the example, the feedforward terms Vdff, Vqff are set by determining the relationship between the corrected predicted electric angle θees2, the torque command Tm*, and the rotation speed Nm of the motor 32 and the feedforward terms Vdff, Vqff in advance, storing the relationship in the ROM 54 as a feedforward term setting map, and if the corrected predicted electric angle θees2, the torque command Tm*, and the rotation speed Nm of the motor 32 are given, deriving the corresponding feedforward terms Vdff, Vqff from the map. An example of the feedforward term setting map is shown in FIGS. 5A and 5B. FIG. 5A is a map for setting the feedforward term Vdff, and FIG. 5B is a map for setting the feedforward term Vqff. In the feedforward term setting map, the feedforward terms Vdff, Vqff suitable for cancelling the torque ripple of the motor 32 may be determined by an experiment or analysis in advance according to the corrected predicted electric angle θees2, the torque command Tm*, and the rotation speed Nm of the motor 32.

Then, as shown in Expressions (5) and (6), the sums of the feedforward terms Vdff, Vqff and the feedback terms Vdfb, Vqfb are set as the voltage commands Vd*, Vq* of the d-axis and the q-axis (Step S210).

$$Vd^* = Vdff + Vdfb \quad (5)$$

$$Vq^* = Vqff + Vqfb \quad (6)$$

Next, the voltage commands Vd*, Vq* of the d-axis and the q-axis are coordinate-converted (two-phase to three-phase conversion) to voltage commands Vu*, Vv*, Vw* of the U-phase, the V-phase, and the W-phase using the predicted electric angle θees1 of the motor 32 (Step S220). Then, the voltage commands Vu*, Vv*, Vw* of the U-phase, the V-phase, and the W-phase are converted to the PWM signal for switching the transistors T11 to T16 of the inverter 34, the PWM signal is output to the inverter 34 to switch the transistors T11 to T16 of the inverter 34 (Step S230), and this routine ends.

In the example, it can be considered that torque corresponding to the feedforward terms Vdff, Vqff and torque corresponding to values (Id*−Idtmp), (Iq*−Iqtmp) of the d-axis and the q-axis obtained by subtracting the basic current commands Idtmp, Iqtmp from the current commands Id*, Iq* of the d-axis and the q-axis correspond to cancel torque Tcn for cancelling the torque ripple of the motor 32. In the example, since the correction coefficient ki for use in calculating the current commands Id*, Iq* of the d-axis and the q-axis is set using the corrected predicted electric angle θees2 in consideration of the electric angle compensation amount Δθe2 based on the rotation speed Nm of the motor 32 and the feedforward terms Vdff, Vqff are set using the corrected predicted electric angle θees2, the cancel torque Tcn can be made more suitable than when these values are set using the electric angle θe, or the predicted electric angle θees1. With this, it is possible to more sufficiently suppress the torque ripple of the motor 32, and to more sufficiently suppress vibration and noise of the motor 32. If the rotation speed Nm of the motor 32 becomes comparatively high, the cycle time of the torque ripple of the motor 32 becomes comparatively short; thus, it may not be possible to sufficiently suppress the torque ripple of the motor 32 only with the feedback terms Vdfb, Vqfb using the correction coefficient ki based on the corrected predicted electric angle θees2. In the example, with the use of the feedforward terms Vdff, Vqff according to the corrected predicted electric angle θees2, even when the rotation speed Nm of the motor 32 is comparatively high, it is possible to more sufficiently suppress the torque ripple of the motor 32, and to more sufficiently suppress vibration and noise of the motor 32.

In the drive device provided in the electric vehicle 20 of the example described above, first, the electric angle compensation amount Δθe2 is set to be larger when the rotation speed Nm of the motor 32 is high than that when the rotation speed Nm of the motor 32 is low. Subsequently, the corrected predicted electric angle θees2 is set by adding the electric angle compensation amount Δθe2 to the predicted electric angle θees1 predicted from the electric angle θe based on the rotation position θm of the rotor of the motor 32 from the rotation position detection sensor 32*a*. Then, the current commands Id*, Iq* of the d-axis and the q-axis are set by multiplying the basic current commands Idtmp, Iqtmp of the d-axis and the q-axis by the correction coefficient ki based on the corrected predicted electric angle θees2, and the transistors T11 to T16 of the inverter 34 are switched using the current commands Id*, Iq* of the d-axis and the q-axis. With such control of the inverter 34, the corrected torque obtained by correcting the torque command Tm* of the motor 32 based on the corrected predicted electric angle θees2 such that the torque ripple of the motor 32 is cancelled can be output from the motor 32. With this, it is possible to more sufficiently suppress the torque ripple of the motor 32, and to more sufficiently suppress vibration and noise of the motor 32.

In the drive device provided in the electric vehicle 20 of the example, the current commands Id*, Iq* of the d-axis and the q-axis are set by multiplying the basic current commands Idtmp, Iqtmp of the d-axis and the q-axis by the correction coefficient ki based on the corrected predicted electric angle θees2, and then, the current commands Id*,Iq* (corresponding to the torque of the sum of the torque command Tm* of the motor 32 and the cancel torque Tcn) obtained by correcting the torque command Tm* based on the corrected predicted electric angle θees2 such that the torque ripple of the motor 32 is cancelled are set. Alternatively, the cancel torque Tcn based on the corrected predicted electric angle θees2 may be converted to cancel current command Idcn, Iqcn of the d-axis and the q-axis, and as shown in Expressions (7) and (8), the current commands Id*, Iq* of the d-axis and the q-axis may be set by adding the cancel current commands Idcn, Iqcn of the d-axis and the q-axis to the basic current commands Idtmp, Iqtmp of the d-axis and the q-axis.

$$Id^* = Idtmp + Idcn \quad (7)$$

$$Iq^* = Iqtmp + Iqcn \quad (8)$$

In the drive device provided in the electric vehicle 20 of the example, the current commands Id*, Iq* of the d-axis and the q-axis are set by multiplying the basic current commands Idtmp, Iqtmp of the d-axis and the q-axis based on the torque command Tm* of the motor 32 by the correction coefficient ki based on the corrected predicted electric angle θees2, and the inverter 34 is controlled using the current commands Id*, Iq* of the d-axis and the q-axis. Alternatively, the torque command Tm* may be reset by multiplying the torque command Tm* of the motor 32 by the correction coefficient based on the corrected predicted electric angle θees2, and the inverter 34 may be controlled such that the reset torque command Tm* is output from the motor 32. Furthermore, the torque command Tm* may be reset by adding the cancel torque Tcn based on the corrected predicted electric angle θees2 to the torque command Tm* of the motor 32, and the inverter 34 may be controlled such that the reset torque command Tm* is output from the motor 32. In these cases, when setting the current commands Id*, Iq* of the d-axis and the q-axis, the basic current commands Idtmp, Iqtmp of the d-axis and the q-axis based on the torque command Tm* may be set as the current commands Id*, Iq* of the d-axis and the q-axis as they are.

In the drive device provided in the electric vehicle 20 of the example, the current commands Id*, Iq* of the d-axis and the q-axis are set by multiplying the basic current commands Idtmp, Iqtmp of the d-axis and the q-axis by the correction coefficient ki based on the corrected predicted electric angle θees2 regardless of the rotation speed Nm of the motor 32. Alternatively, when the rotation speed Nm of the motor 32 is equal to or less than a threshold Nmref, the current commands Id*, Iq* of the d-axis and the q-axis may be set by multiplying the basic current commands Idtmp, Iqtmp of the d-axis and the q-axis by the correction coefficient ki based on the corrected predicted electric angle θees2, and when the rotation speed Nm of the motor 32 is larger than the threshold Nmref, the basic current commands Idtmp, Iqtmp of the d-axis and the q-axis may be set as the current commands Id*, Iq* of the d-axis and the q-axis as they are. The threshold Nmref is an upper limit of the range of the rotation speed of the motor 32 in which the torque ripple of the motor 32 can be sufficiently suppressed by the feedback terms Vdfb, Vqfb using the correction coefficient ki based on the corrected predicted electric angle θees2.

In the drive device provided in the electric vehicle 20 of the example, the feedforward terms Vdff, Vqff are set regardless of the rotation speed Nm of the motor 32, and the voltage commands Vd*, Vq* of the d-axis and the q-axis are set using the feedforward terms Vdff, Vqff and the feedback terms Vdfb, Vqfb. Alternatively, when the rotation speed Nm of the motor 32 is larger than a threshold Nmref2, the feedforward terms Vdff, Vqff are set and the voltage commands Vd*, Vq* of the d-axis and the q-axis are set using the feedforward terms Vdff, Vqff and the feedback terms Vdfb, Vqfb, and when the rotation speed Nm of the motor 32 is equal to or less than the threshold Nmref2, the voltage commands Vd*, Vq* of the d-axis and the q-axis may be set only using the feedback terms Vdfb, Vqfb without setting the feedforward terms Vdff, Vqff. This is because it is considered that, when the rotation speed Nm of the motor 32 is comparatively low, the torque ripple of the motor 32 can be sufficiently cancelled only with the feedback terms Vdfb, Vqfb. Then, only when the rotation speed Nm of the motor 32 is larger than the threshold Nmref2, the feedforward terms Vdff, Vqff are set using the feedforward term setting map, whereby it is possible to reduce the amount of data (the amount of data stored in the ROM 54) of the feedforward term setting map. As the threshold Nmref2, the same value as the above-described threshold Nmref may be used, or a value slightly smaller than the threshold Nmref may be used.

In the drive device provided in the electric vehicle 20 of the example, the feedforward terms Vdff, Vqff of the voltage commands Vd*, Vq* of the d-axis and the q-axis are set based on the corrected predicted electric angle θees2, the torque command Tm*, and the rotation speed Nm of the motor 32. Alternatively, the feedforward terms Vdff, Vqff may be set based on any one of the corrected predicted electric angle θees2, the torque command Tm*, and the rotation speed Nm of the motor 32. Furthermore, the feedforward terms Vdff, Vqff may be set only based on the corrected predicted electric angle θees2 of the motor 32.

In the drive device provided in the electric vehicle 20 of the example, the voltage commands Vd*, Vq* of the d-axis and the q-axis are set using the feedforward terms Vdff, Vqff and the feedback terms Vdfb, Vqfb. Alternatively, the voltage commands Vd*, Vq* of the d-axis and the q-axis may be set only using the feedback terms Vdfb, Vqfb.

In the example, the drive device is mounted the electric vehicle 20 which travels only using power from the motor 32. Alternatively, the drive device may be mounted in a hybrid vehicle which travels using power from a motor and power from an engine. Furthermore, the drive device may be mounted in equipment which does not move, such as construction facilities.

The correspondence relationship between the primary components of the example and the primary components of the disclosure described in Summary will be described. In the example, the motor 32 corresponds to a "motor", the inverter 34 corresponds to an "inverter", and the ECU 50 which calculates the electric angle of the motor 32 and the rotation speed of the motor 32 and executes the motor control routine of FIG. 2 corresponds to an "ECU".

The correspondence relationship between the primary components of the example and the primary components of the disclosure described in Summary should not be considered to limit the components of the disclosure described in Summary since the embodiment is only illustrative to specifically describe the mode for carrying out the disclosure.

That is, the disclosure described in Summary should be interpreted based on the description in Summary, and the example is only a specific example of the disclosure described in Summary.

Although the mode for carrying out the disclosure has been described using the example, the disclosure is not limited to the example, and can be of course carried out in various modes without departing from the scope and spirit of the disclosure.

The disclosure can be applied to a manufacturing industry of a drive device.

What is claimed is:

1. A drive device comprising:
    a motor;
    an inverter configured to drive the motor by switching a plurality of switching elements; and
    an electronic control unit configured to
        i) calculate an electric angle of the motor and a rotation speed of the motor,
        ii) set an electric angle compensation amount for compensating for deviation between an actual electric angle of the motor when a control signal is output from the electronic control unit to the inverter and an actual electric angle of the motor when a torque of the motor changes based on the control signal, wherein the electric angle compensation amount is set to increase as the rotation speed of the motor increases,
        iii) set an electric angle for compensation using the electric angle of the motor and the electric angle compensation amount,
        iv) set corrected torque by correcting required torque required for the motor based on the electric angle for compensation such that a torque ripple of the motor is cancelled, and
        v) control the inverter such that the corrected torque is output from the motor.

2. The drive device according to claim 1,
wherein the electronic control unit is configured to
    vi) set a basic current command of a d-axis based on the required torque,
    vii) set a basic current command of a q-axis based on the required torque,
    viii) set a correction coefficient for cancelling the torque ripple based on the required torque and the electric angle for compensation,
    ix) set a current command of the d-axis by multiplying the basic current command of the d-axis by the correction coefficient,
    x) set a current command of the q-axis by multiplying the basic current command of the q-axis by the correction coefficient, and
    xi) control the inverter using the current command of the d-axis and the current command of the q-axis.

3. The drive device according to claim 2,
wherein the electronic control unit is configured to
    xii) set a feedback term of the d-axis based on the current command of the d-axis and a current of the d-axis,
    xiii) set a feedforward term of the d-axis based on the electric angle for compensation, the required torque, and the rotation speed of the motor,
    xiv) set a voltage command of the d-axis using the feedforward term of the d-axis and the feedback term of the d-axis,
    xv) set a feedback term of the q-axis based on the current command of the q-axis and a current of the q-axis,
    xvi) set a feedforward term of the q-axis based on the electric angle for compensation, the required torque, and the rotation speed of the motor,
    xvii) set a voltage command of the q-axis using the feedforward term of the q-axis and the feedback term of the q-axis, and
    xviii) control the inverter using the voltage command of the d-axis and the voltage command of the q-axis.

4. A control method for a drive device, the drive device including
    a motor,
    an inverter configured to drive the motor by switching a plurality of switching elements, and
    an electronic control unit,
the control method comprising
    i) calculating, by the electronic control unit, an electric angle of the motor and a rotation speed of the motor,
    ii) setting, by the electronic control unit, an electric angle compensation amount for compensating for deviation between an actual electric angle of the motor when a control signal is output from the electronic control unit to the inverter and an actual electric angle of the motor when a torque of the motor changes based on the control signal, wherein the electric angle compensation amount is set to increase as the rotation speed of the motor increases,
    iii) setting, by the electronic control unit, an electric angle for compensation using the electric angle of the motor and the electric angle compensation amount,
    iv) setting, by the electronic control unit, corrected torque by correcting required torque required for the motor based on the electric angle for compensation such that a torque ripple of the motor is cancelled, and
    v) controlling, by the electronic control unit, the inverter such that the corrected torque is output from the motor.

* * * * *